United States Patent [19]
Christy

[11] 3,918,327
[45] Nov. 11, 1975

[54] MECHANICAL MOVEMENT DEVICE

[76] Inventor: Charles A. Christy, 201 Airport Drive, Farmington, N. Mex. 87401

[22] Filed: Feb. 5, 1974

[21] Appl. No.: 439,748

[52] U.S. Cl. .................................. 74/600; 74/571
[51] Int. Cl.² ........................................ G05G 1/00
[58] Field of Search ..................... 74/600, 63, 571

[56] References Cited
UNITED STATES PATENTS

| | | | |
|---|---|---|---|
| 2,022,631 | 11/1935 | Woodford | 74/600 |
| 2,250,385 | 7/1941 | Maier | 74/600 |
| 3,168,050 | 2/1965 | Laing | 74/63 |
| 3,529,480 | 9/1970 | Kaspareck | 74/63 |

Primary Examiner—Samuel Scott
Assistant Examiner—Wesley S. Ratliff, Jr.
Attorney, Agent, or Firm—Karl W. Flocks

[57] ABSTRACT

A mechanical movement device comprising a main rotary member rotatably mounted on frame means and formed with radial slot means opening to the periphery thereof; adjustable crank means rotatably mounted coaxially with said main rotary member and selectively locked to said frame means against rotation at selected locations; said crank means having a crank throw on which connecting link means are hingedly connected at one end; and slide means hingedly connected to said link means at the other end thereof and adapted to slide radially within said slot means and out beyond the periphery of said rotary member upon rotation of said rotary member. The said slide means being adaptable to slide out of said slot means and back into said slot means at any particular orientation of said slot means with respect to the face of a clock by selectively rotating said crank means to a selected position and locking same to said frame means against rotation.

14 Claims, 6 Drawing Figures

MECHANICAL MOVEMENT DEVICE

BACKGROUND OF THE INVENTION

Mechanical movement devices have since the beginning of time amused and amazed mankind. While such devices frequently find little practical value except for amusement, many have gone on to serve man by reduction of labor, by increase in speed of machine operations, and otherwise advancing man's standards of living to new frontiers previously unattainable.

SUMMARY

This invention provides a mechanical movement device which is simple to construct and to operate and yet is capable of producing mechanical effects not believed to be known heretofore.

Prior art devices found to be most relevant include machine structure exemplified in the Benedek U.S. Pat. No. 2,006,880 and the Ferris U.S. Pat. No. 2,427,325. These patents include sliding piston members confined within an enclosure.

The present invention provides a mechanical movement device adapted to be rotatably supported on a frame and in which one or more slide members may be moved radially in and out of slot means formed therein at adjustable select locations whereby said slide members may be confined within said slot means or projected out therefrom to provide a productive effect.

This invention further provides a device in which a slide member is adapted to move radially in and out of a slot formed in a rotary member and constrained to rotate along with said rotary member to produce a combined rotary and slide motion.

This invention moreover provides a device in which a retractable rotatable slide member may find use in the assembly of pumps, water wheels, earth moving devices, and numerous other applications.

BRIEF DESCRIPTION OF THE DRAWINGS

With the foregoing in mind the present invention will be better understood by reference to the accompanying drawings in which.

DESCRIPTION OF THE ILLUSTRATED EMBODIMENT

Figure 1:
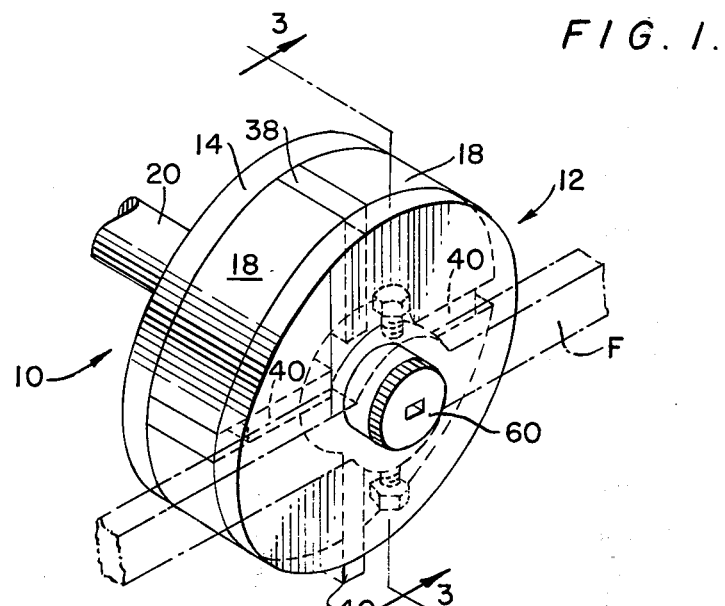
FIG. 1 is an assembly view in perspective of the mechanical movement device according to the present invention.

Reference is now made to FIGS. 1–4 of the drawings from which various parts making up an exemplary embodiment of the mechanical movement device 10 according to the present invention may be clearly seen. A rotor assembly 12 constitutes an essential part of the device 10 of the present invention. The rotor assembly 12 includes a first end plate 14 and a second end plate 16 with a plurality of spacer segments 18 sandwiched therebetween.

Figure 3:
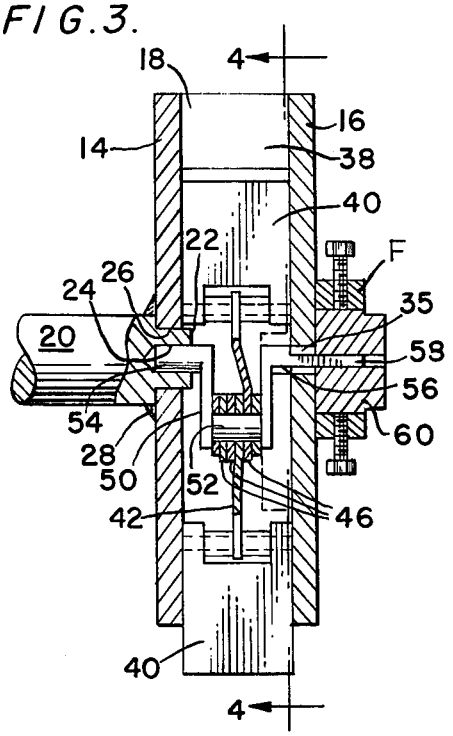
FIG. 3 is a vertical sectional view taken along line 3—3 in FIG. 1.

An input drive shaft 20 which for convenience is formed with a reduced diameter end portion 22 in assembly is disposed in a hole 26 formed in the first end plate 14. The end 22 of shaft 20 is formed with a coaxial cylindrical bore 24 therein. An assembly shaft 20 is fixed to end plate 14 and, as seen in FIG. 3, may be fixed thereto by weld 28.

Figure 2:
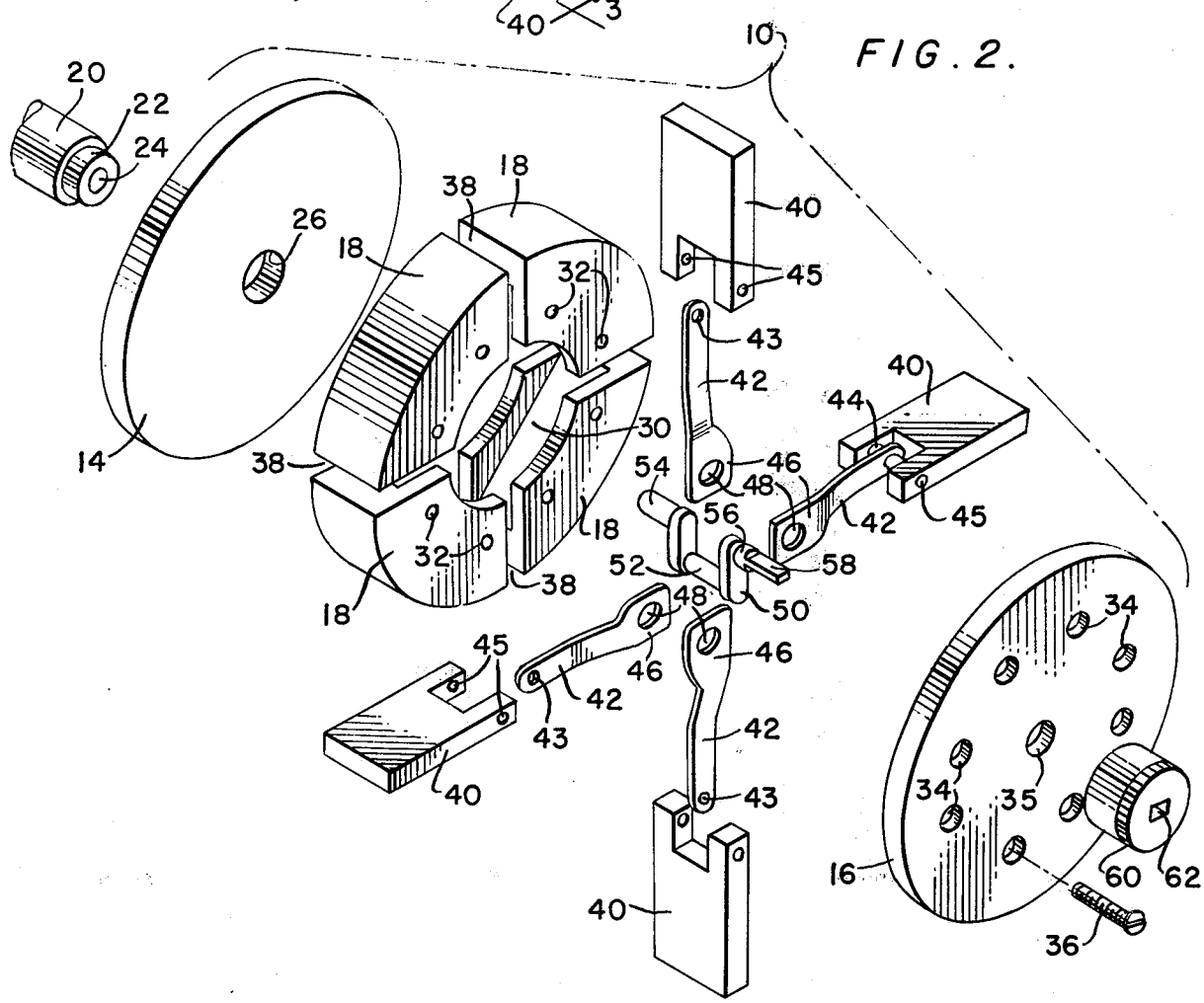
FIG. 2 is an exploded view in perspective of the device of FIG. 1.

Each segment 18, as shown, is generally arcuate, although it need not have such configuration. A cavity 30, as best seen in FIG. 2, is provided in each segment 18 in which various elements of the rotary device 10 are situated in assembly and for movement therein. A plurality of screw holes 32 are provided in one face of each segment 18 by which end plate 16 may be secured by passing screws 36 through holes 34 and threaded in holes 32 aligned therewith. End plate 16 is formed with a centrally located hole 55 which is coaxial with hole 26 in assembly.

In the rotor assembly radial slots 38 are formed between adjacent segments 18 in which a plurality of vanes or slide members 40 are disposed for sliding motion therein and outwardly beyond the periphery of the rotor assembly 12. Each vane or slide member 40 is hingedly connected to a connecting link 42 by a pin 44 extending through hole 43 of connecting link 42 and aligned bores 45 in slide members 40. Crank end 46 of each connecting link 42 is formed with a hole 48 which may be passed over one end of a pivot post member 50 having the general configuration of a crank element and hereinafter referred to as crank 50. Hole 48 is then disposed in pivotal relationship around a throw 52 of crank 50. The crank 50 is formed with a pair of oppositely directed trunnions 54 and 56. Trunnion 56 includes a flat end portion 58. A selection knob 60 with a hole 62 is secured around flat end portion 58.

In the assembled condition of the rotary device 10, trunnion 54 and trunnion 56 are coaxially journaled in holes 26 and 35 of end plates 14 and 16, respectively.

Figure 4:
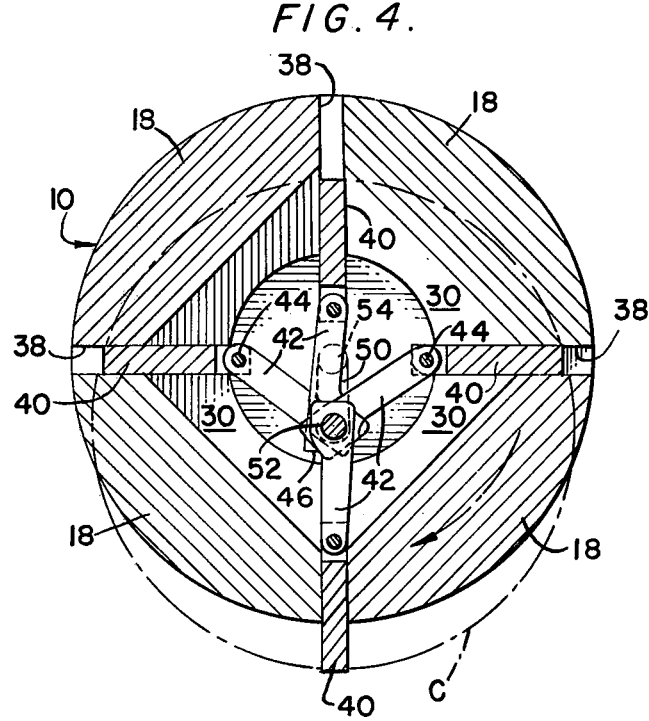
FIG. 4 is a vertical sectional view taken along line 4—4 in FIG. 3.
Figure 5:
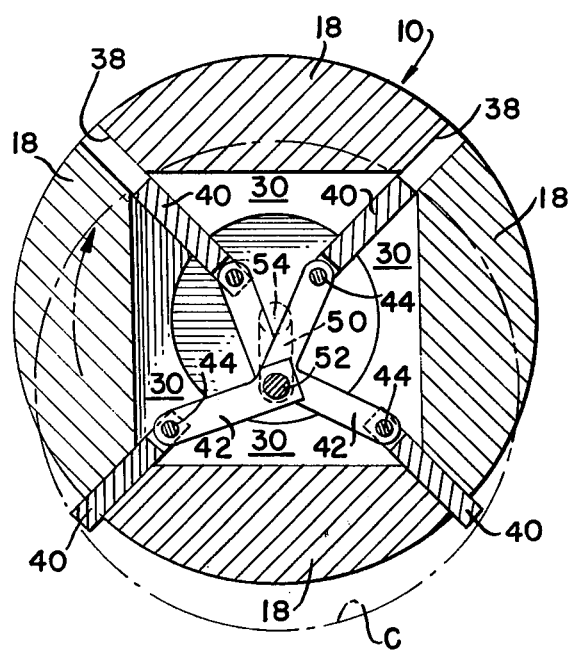
FIG. 5 is a view similar to FIG. 4, but with the various parts of the device rotated except for a crank member which is held in the position of FIG. 4.

FIGS. 3–5 represent a particular mode of operation of the device 10 wherein each slide member 40 will be rotated with the outer end thereof tracing the circle C outlined in phantom. According to the mode illustrated each slide member will extend out of its slot 38 where the circle C is not superposed over segments 18 of rotor assembly 12. Maximum extension of each slide member 40 occurs at a position corresponding to the hour hand at six o'clock. This mode of operation is achieved by turning selection knob 60 so that crank 50 is set with its throw 52 along a vertical line extending down from the center of the rotor assembly 12 or, as seen in FIG. 4, of the trunnion 54. Once the desired mode of operation is selected, knob 60 is locked against rotation as to a fixed frame portion F by lock-screws, for example. Operation of the device 10 is then carried out by rotating shaft 20 to thereby rotate rotor assembly 12. As rotor assembly 12 is rotated about trunnions 54 and 56, which are in journaled relationship therewith, the slots 38 impart rotary motion to slide members 40. As the slide members 40 are hinged to connecting links 42, which in turn are hinged to crank 50, they rotate in orbital fashion about the throw 52 of crank 50. Because of the eccentric relationship between circle C and rotor assembly 12, which, as shown, is in the form of a circle, slide members 40 will move in and out of the slots 38 as seen in FIG. 5. It is clear that trunnion 56, which is journaled in hole 35 of end plate 16 in operation contributes to the support of rotor assembly 12. This stationary support relationship is derived from the fact that the flat end portion 58 of trunnion 56 extends into hole 62 of selection knob 60 which in turn is locked to fixed frame portion F. Moreover, it is also clear in FIG. 4 that the reciprocation of each vane 40 and the distance of tips of opposed vanes are varied and controlled by means of the links 42. For example, in FIG. 4 the distance between the tips of opposed vertical vanes 40 is greater than that of opposed horizontal vanes 40. Where a rotor assembly is provided with an odd number of vanes 40, the links 42 associated with such odd nummber of vanes 40 obviously would, within the concept of the present invention, control the reciprocation of each vane, and the distance between the tip of each such odd number of vanes and the tip of a vane which would be opposed to each such odd number of vanes if instead there were an even number of vanes.

Figure 6:
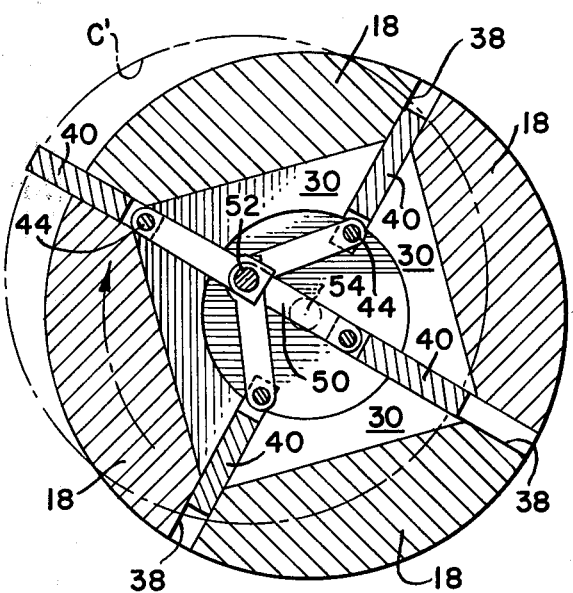
FIG. 6 is a view generally similar to FIG. 5, but with the crank member rotated from the position illustrated in FIGS. 4 and 5.

With the foregoing mode it is clear that maximum external movement of each slide member 40 is synchronized by rotary motion thereof to a position corresponding to the hour hand at six o'clock. Maximum external movement of each slide member may be synchronized to alternative modes or positions corresponding to the position of the hour hand on a clock at any time, this being accomplished by unlocking selection knob 60 and turning it to set crank 50 with its throw 52 in the desired direction away from the center of trunnions 54,56 and thereafter locking knob 60 against rotation. Such an alternative mode may be seen in FIG. 6 wherein throw 52 extends from trunnions 54,56 toward about ten o'clock so that the outer edge of each slide member 40 reaches maximum extension out of its respective slot at about ten o'clock and traces the circle C'.

It is clear that with the present invention a device is provided with a retractable sweeping action which is adaptable to performing numerous mechanical operations, particularly where selective orientation of such action is desired.

Although the invention has been described with a certain degree of particularity, it is understood that the present disclosure has been made only by way of example and the numerous changes in details of construction and the combination and arrangement of parts may be resorted to without departing from the spirit and scope of the invention as hereinafter claimed.

What is claimed is:

1. A mechanical movement device for synchronized external motion in rotary motion, said device comprising a rotor assembly supported for rotation about a fixed axis and having slot means therein, slide means disposed in said slot means for rotation therewith and to slide therein, a crank element having coaxial trunnions extending through opposite sides of said rotor assembly and having a crank throw eccentric thereto, connecting means hingedly connecting said slide means to said crank throw in eccentric relationship to the center of rotation of said rotor assembly, said crank element being rotatably adjustable to various circumferential positions and having locking means for securing said crank element against undesired rotation, said slide means being rotated by said slot means as said rotor assembly rotates, said slide means moving with outer edges thereof tracing a circle eccentric to the center of said rotor assembly so that said outer edges extend out of said slot means at times and within said slot means at other times.

2. The mechanical movement device of claim 1 wherein said slot means includes two or more radial slots, said slide means includes two or more slide members and each of said slide members are disposed in one of said slots.

3. The mechanical movement device of claim 2 including input drive means connected to said rotor assembly.

4. The mechanical movement device of claim 3 wherein said crank element includes a pair of transversely extending trunnions each of which is supported coaxially of and in journaled relationship with said rotor assembly.

5. The mechanical movement device of claim 4 wherein said connecting means is in the form of a connecting link hinged at one end to said slide member and at its other end to said crank throw.

6. The mechanical movement device of claim 5 wherein one of said trunnions includes a non-circular extension extending out of said rotor assembly and into a selection knob with a mating non-circular opening for said extension.

7. The mechanical movement device of claim 6 wherein said rotor assembly comprises a plurality of circumferentially spaced segments forming said radial slots.

8. The mechanical movement device of claim 7 wherein each of said spaced segments is formed with a cavity within which said crank element, said connecting links and said slide members are disposed in assembly.

9. The mechanical movement device of claim 8 wherein said rotor assembly device includes a pair of end plates between which said segments are sandwiched and secured thereto.

10. The mechanical movement device of claim 9 wherein said input drive means is fixedly secured to said rotor assembly at one of said end plates.

11. A mechanical movement device for synchronized external motion in rotary motion, said device comprising a rotor assembly supported by support means for rotation about a fixed axis, said rotor assembly having slot means therein, slide means disposed in said slot means for rotation therewith and to slide therein, connecting means hingedly connecting said slide means to said support means for rotation about a common center but in eccentric relationship to the fixed axis of rotation of said rotor assembly, said support means being rotatably adjustable to various positions for varying the eccentric relationship of said slide means to the fixed axis, said support means having locking means for securing said support means against undesired rotation, said slide means being rotated by said slot means as said rotor assembly rotates, said slide means moving with outer edges thereof tracing a circle eccentric to the center of said rotor assembly so that said outer edges extend out of said slot means at a selected time or circumferential position and within said slot means at other circumferential positions.

12. A mechanical movement device for synchronized external motion in rotary motion, said device comprising a rotor assembly, means supporting said rotor assembly for rotations about a fixed axis, said rotor assembly having slot means therein, slide means disposed in said slot means for rotation therewith and to slide therein, said slide means including two or more vanes or like members, stationary means operatively related to said rotor assembly and each of said vanes whereby rotation of said rotary assembly relative to said stationary means will effect rotation of each of said vanes and also radially inwardly and outwardly movement of said vanes in said slot means, said stationary means also being effective to limit radially outward movement of said vanes, each of said vanes having a common axis of rotation in eccentric relationship to the center of rotation of said rotor assembly whereby said vanes will trace a circle eccentric to a circle traced by said rotor assembly, said slide means actually obtaining its rotation from said slot means as said rotor assembly rotates.

13. In a mechanical movement device for synchronized external motion in rotary motion, a rotor assembly comprising a first part adapted to rotate about a first axis and a second part including a plurality of opposed reciprocating units moving radially with respect to said first part, first motion transmitting means located on each of said reciprocating units, second motion controlling means contacting each of said first means for controlling the amount of reciprocation of each of said units in a manner to vary the distance between tips of opposed units when said first part is rotating about said first axis.

14. In a mechanical movement device for synchronized external motion in rotary motion, a rotor assembly comprising a first part adapted to rotate about a first axis and a second part including a plurality of reciprocating units moving radially with respect to said first part, first motion transmitting means located on each of said reciprocating units, second motion transmitting means contacting each of said first means for controlling the amount of reciprocation of each of said units in a manner to vary the distance between the tip of each unit and the tip of an opposed unit or of a unit which would be opposed to each unit where there is an odd number of reciprocating units when said first part is rotating about said first axis.

* * * * *